United States Patent
Chen et al.

(10) Patent No.: US 8,428,471 B2
(45) Date of Patent: Apr. 23, 2013

(54) OPTICAL ACCESS SYSTEM FOR DUAL SERVICE NETWORK

(75) Inventors: Jyehong Chen, Jhubei (TW); Chun-Ting Lin, Taichung (TW); Po-Tsung Shih, Tainan (TW); Peng-Chun Peng, Jhonghe (TW); Sheng-Peng Dai, Guanyin Township, Taoyuan County (TW); Sien Chi, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 828 days.

(21) Appl. No.: 12/461,567

(22) Filed: Aug. 17, 2009

(65) Prior Publication Data

US 2010/0008665 A1  Jan. 14, 2010

(30) Foreign Application Priority Data

Jul. 11, 2008  (TW) ................................. 97143105 A

(51) Int. Cl.
*H04B 10/04* (2006.01)
*H04B 10/00* (2006.01)
*H04B 10/12* (2006.01)
*H04J 14/00* (2006.01)

(52) U.S. Cl.
USPC ............. 398/185; 398/115; 398/43; 398/183

(58) Field of Classification Search .................... 398/43, 398/46, 115
See application file for complete search history.

(56) References Cited

U.S. PATENT DOCUMENTS

| | | | |
|---|---|---|---|
| 5,896,213 A | 4/1999 | Nagahori et al. | |
| 5,949,564 A * | 9/1999 | Wake | 398/168 |
| 6,826,164 B2 | 11/2004 | Mani et al. | |
| 7,127,176 B2 | 10/2006 | Sasaki | |
| 7,908,625 B2 * | 3/2011 | Robertson et al. | 725/82 |
| 8,019,232 B2 * | 9/2011 | Boffi et al. | 398/185 |
| 2003/0198478 A1 * | 10/2003 | Vrazel et al. | 398/183 |
| 2005/0191061 A1 * | 9/2005 | Liu et al. | 398/188 |

(Continued)

FOREIGN PATENT DOCUMENTS

TW     200610305     3/2006

OTHER PUBLICATIONS

Communication From Taiwan Patent Office in a Counterpart Foreign Application Dated (Taiwan Year 101) Jun. 20, 2012.

(Continued)

*Primary Examiner* — Kenneth N Vanderpuye
*Assistant Examiner* — Abbas H Alagheband
(74) *Attorney, Agent, or Firm* — Rosenberg, Klein & Lee

(57) ABSTRACT

The present invention relates to an optical access system for dual service network, which mainly comprises an optical modulation device which is used to receive on-off keying (OOK) signal from cable network and radio frequency (RF) signal from wireless network, the optical modulation device then modulates the OOK signal and the RF signal to an optical signal and send out an output optical signal. Lastly, the output optical signal is being delivered to an optical receiving device through an optical fiber transmission channel, and the optical receiving device can access the OOK signal and RF signal from the output optical signal. In addition, the present invention does not require remote nodes (receiver side) to use any optical filter to discern on-off keying signal from cable network and RF signal from wireless network. The present invention can also apply to the field of wavelength-division multiplexing system.

16 Claims, 6 Drawing Sheets

U.S. PATENT DOCUMENTS

| | | | | |
|---|---|---|---|---|
| 2006/0263098 | A1* | 11/2006 | Akiyama et al. | 398/188 |
| 2006/0291863 | A1* | 12/2006 | Chan et al. | 398/115 |
| 2007/0248362 | A1 | 10/2007 | Tanaka et al. | |
| 2007/0274731 | A1* | 11/2007 | Boffi et al. | 398/188 |
| 2009/0092401 | A1* | 4/2009 | Sekine et al. | 398/185 |
| 2009/0142069 | A1* | 6/2009 | Wree et al. | 398/147 |
| 2011/0008061 | A1* | 1/2011 | Fujii | 398/203 |
| 2011/0013911 | A1* | 1/2011 | Alexander et al. | 398/79 |

OTHER PUBLICATIONS

Charles N. Lo; A Hybrid Lightwave Transmission System for Subcarrier Multiplexed Video and Digital B-ISDN Services in the Local Loop, Journal of Lightwave Technology, vol. 7, No. 11, Nov. 1989, pp. 1839-1848.

Tomotada Kamisaka, Toshiaki Kuri, and Ken-Ichi Kitayama, Simultaneous Modulation and Fiber-Optic Transmission of 10-Gb/s Baseband and 60-GHz-Band Radio Signals on a Single Wavelength, IEEE Transactions on Microwave Theory and Techniques, vol. 49, No. 10, Oct. 2001, pp. 2013-2017.

Kensuke Ikeda, Toshiaki Kuri, and Ken-Ichi Kitayama, Simultaneous Three-Band Modulation and Fiber-Optic Transmission of 2.5-Gb/s Baseband, Microwave-, and 60-GHz-Band Signals on a Single Wavelength, Journal of Lightwave Technology, vol. 21, No. 12, Dec. 2003, pp. 3194-3202.

Gee-Kung Chang, Jianjun Yu, Zhensheng Jia, and Jianguo Yu, Novel Optical-Wireless Access Network Architecture for Simultaneously Providing Broadband Wireless and Wired Services, OFM1.pdf.

* cited by examiner

OPTICAL ACCESS SYSTEM FOR DUAL SERVICE NETWORK

BACKGROUND OF THE INVENTION

1. Field of the Invention

The present invention relates to an optical access network system, particularly to an optical access system for dual service network.

2. Description of the Related Art

Fiber-optic communication is a communication method based on optical signal and fibers which is also a kind of cable communication. Light can be used to carry information after being modulated where it features a superior transmission capacity and a high information security. Since 1980s, the fiber-optic communication system plays a very important role in the digital world. In principle, the outgoing information is transferred from the sender side to the transmitter, and the signal modulates the carrier wave, which functions as the transmission medium of information, and then the modulated carrier wave is sent to the recipient side in a distant place, and the receiver demodulates the modulated carrier wave to obtain the original information.

Since the development for wireless and cable network has grown rapidly for the past few years, the demand for higher transmission speed and bandwidth has also increased. Current, the best solution would be to use optical fiber as a transmission carrier between wireless and cable network. As a result, many dual-service optical communication related inventions have been proposed lately, however, those newly proposed inventions still have many obstacles to overcome with. For example, in U.S. Pat. No. 7,127,176, the proposed invention utilizes optical fiber as radio frequency (RF) and uses semiconductor optical amplifier and electro-absorption electro-optic modulator at its base station. However, optical fiber dispersion will decrease signal strength for RF over long distance, create a restriction on its practical applications. Additionally, in the paper "Optical Fiber Communication Conference" released by GK. Chang on 2006, in order to solve the optical fiber dispersion issue among long distance transmission, Chang proposed using Double Sideband Suppressed Carrier Modulation. Unfortunately, this kind of modulation method can only transmit amplitude shift modulation signal, it also required at least two electro-optic modulators which will greatly increase manufacturing cost. To overcome the abovementioned problem, the present invention proposes an optical access system for dual service network which can effectively overcome the problem of RF signal strength being reduced by optical-fiber dispersion over long distance transmission.

SUMMARY OF THE INVENTION

The primary objective of the present invention is to provide an optical access system for dual service network, which can effectively solve the problem of RF signal strength reduced by optical fiber dispersion without using additional electro-optic modulator.

Another objective of the present invention is to provide an optical access system for dual service network that does not require remote nodes (receiver side) to use any optical filter to discern on-off keying (OOK) signal from cable network and RF signal from wireless network. The present invention can also apply to wavelength-division multiplexing (WDM) system.

In order to realize the objectives mentioned above, the optical access system for dual service network of the present invention mainly comprises an optical modulation device which is used to receive OOK signal from cable network and RF signal from wireless network, the optical modulation device then modulates the OOK signal and the RF signal to an optical signal and send out an output optical signal. Lastly, the output optical signal is being delivered to an optical receiving device through an optical fiber transmission channel, and the optical receiving device can access the OOK signal and RF signal from the output optical signal.

Below, the embodiments are described in detail in cooperation with the attached drawings to make easily understood the objectives, technical contents, characteristics and accomplishments of the present invention.

DETAILED DESCRIPTION OF THE INVENTION

Since the development for wireless and cable network has grown rapidly, the demand for higher transmission speed and bandwidth has also increased relatively. The present invention integrates both wireless and cable network communication system to enhance the signal transmission efficiency and also at the same time reduces the system complexity. The present invention can apply on integrated optical communication network, wireless communication network and wavelength-division multiplexing (WDM) system.

Figure 1:
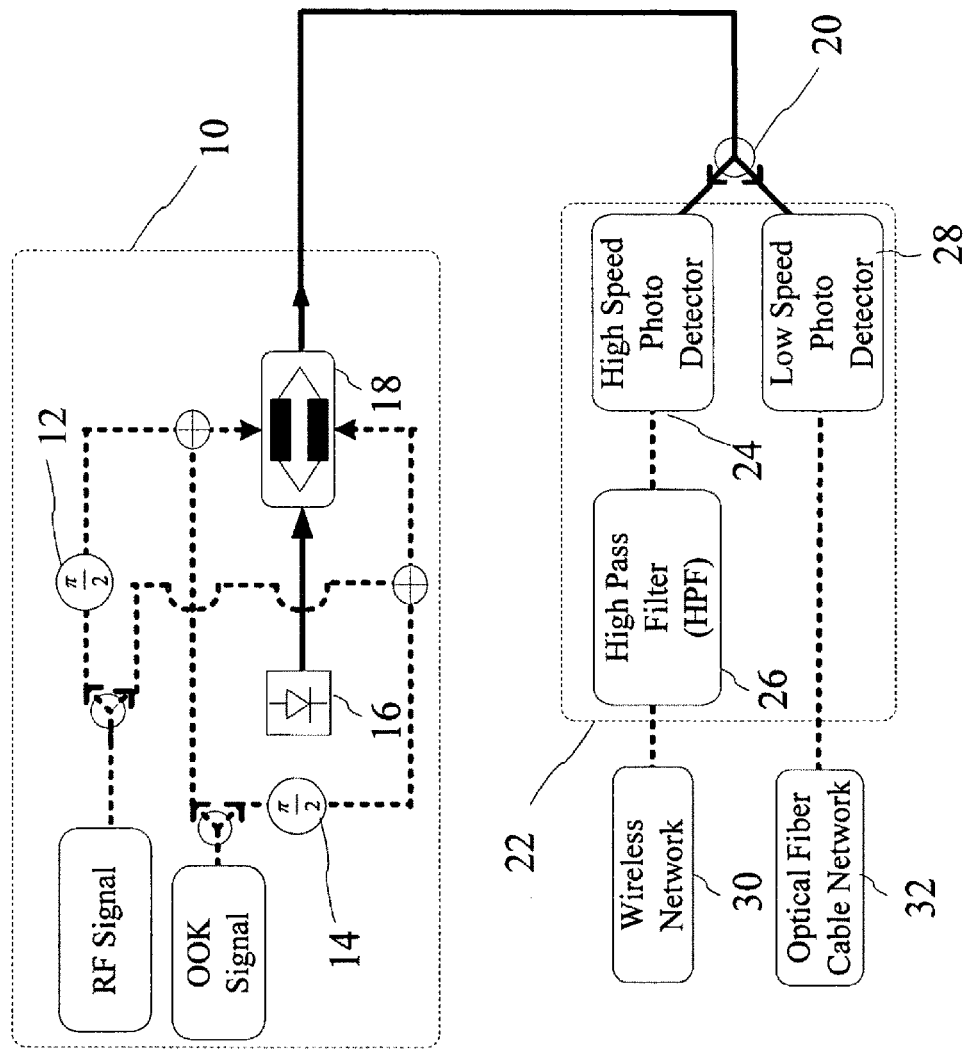
FIG. 1 is a diagram schematically showing the architecture of the present invention.

Please refer to FIG. 1 for a diagram schematically showing the architecture of the present invention where dash line represents traveling path for electrical signal and thick line represents traveling path for optical signal. The present invention comprises an optical modulation device 10 which is used to receive on-off keying (OOK) signal from cable network and radio frequency (RF) signal from wireless network, the optical modulation device 10 then modulates the OOK signal and the RF signal to an optical signal and generates an output optical signal. In addition, the RF signal is in phase shift keying (PSK) format such as binary phase shift keying (BPSK), quadrature phase shift keying (QPSK) or octal phase shift keying (OPSK) and the source of optical signal is laser. The modulated output optical signal is then transmitted to an optical splitter 20 via an optical fiber transmission channel, and received by an optical receiving device 22. The optical receiving device 22 can access the OOK signal and RF signal from the output optical signal.

The optical modulation device 10 further comprises two phase shifters 12 and 14, a laser diode 16 and an electro-optic modulator (Mach-Zehnder modulator) 18. The phase shifter 12 is responsible for receiving the RF signal and shifting the phase of the RF signal by 90 degrees and the phase shifter 14 is responsible for receiving the OOK signal and shifting the phase of the OOK Signal by 90 degrees also. The laser diode 16 is used to generate an optical signal. The electro-optic modulator 18 is responsible of receiving the original OOK signal and the OOK signal from phase shifter 14 at one electrical receiving end, and receiving original RF signal and the RF signal from phase shifter 12 at another electrical receiving end. In addition, an optical receiving end of electro-optic modulator 18 is responsible for receiving the optical signal and bias the electro-optic modulator 18 to a $V_\pi/2$ position, so that it can effect the transmission characteristic of the optical signal, allowing optical signal to modulate with two signals received by the two electrical receiving ends (OOK and RF) and generate an output optical signal to an optical fiber transmission channel.

The optical receiving device 22 further comprises a low speed photo detector 28 and a high pass filter (HPF) 26. The low speed photo detector 28 receives the output optical signal splitted from the optical splitter 20 and extracts the OOK signal which can be used by optical fiber cable network 32 applications such as fiber-to-the-home (FTTH) system. In addition, the present invention is compatible with existing optical receiving device at user ends, therefore, the users does not require any upgrade on their optical receiving devices. The high speed photo detector 24 receives the output optical signal splitted from the optical splitter 20 and output an electrical signal. The HPF 26 in combination with the high speed photo detector 24 can be used to receive the electrical signal and extract the RF signal, which can be used by wireless network 30 applications.

The following will describe the procedure of the present invention in detail. At first, the optical modulation device 10 receives RF and OOK signal, the RF signal will be received by the phase shifter 12 and having its phase shifted by 90 degrees and output to the electro-optic modulator 18, similarly, the OOK signal will be received by the phase shifter 14 and having its phase shifted by 90 degrees also and output to the electro-optic modulator 18. The electro-optic modulator 18 has to electrical receiving ends and one optical receiving end, one electrical receiving end will receive one shifted RF signal and one un-shifted OOK signal, the other electrical receiving end will receive one un-shifted RF signal and one shifted OOK signal. The optical receiving end receives an optical signal generated by a laser diode 16, and when the electro-optic modulator 18's bias is under $V_\pi/2$ state, the electro-optic modulator 18 can effect the transmission characteristic of the optical signal, allowing optical signal to modulate with two signals received by the two electrical receiving ends (OOK and RF) and generate an output optical signal to an optical fiber transmission channel. After passing the optical fiber transmission channel, the output optical signal will be received by an optical splitter 20 and splitted into two signals. One of the two signals will be received by the low speed photo detector 28 and high speed photo detector 24 within the optical receiving device 22, the high speed photo detector 24 combines with HPF 26 can allow low speed photo detector 28 to extract OOK signal, which can be used by the optical fiber cable network 32 applications. In addition, after the high speed photo detector 24 receives the output optical signal, it will output an electrical signal; HPF 26 will receive this electrical signal and extract the RF signal, which can be used by wireless network 30 applications.

Figure 2:
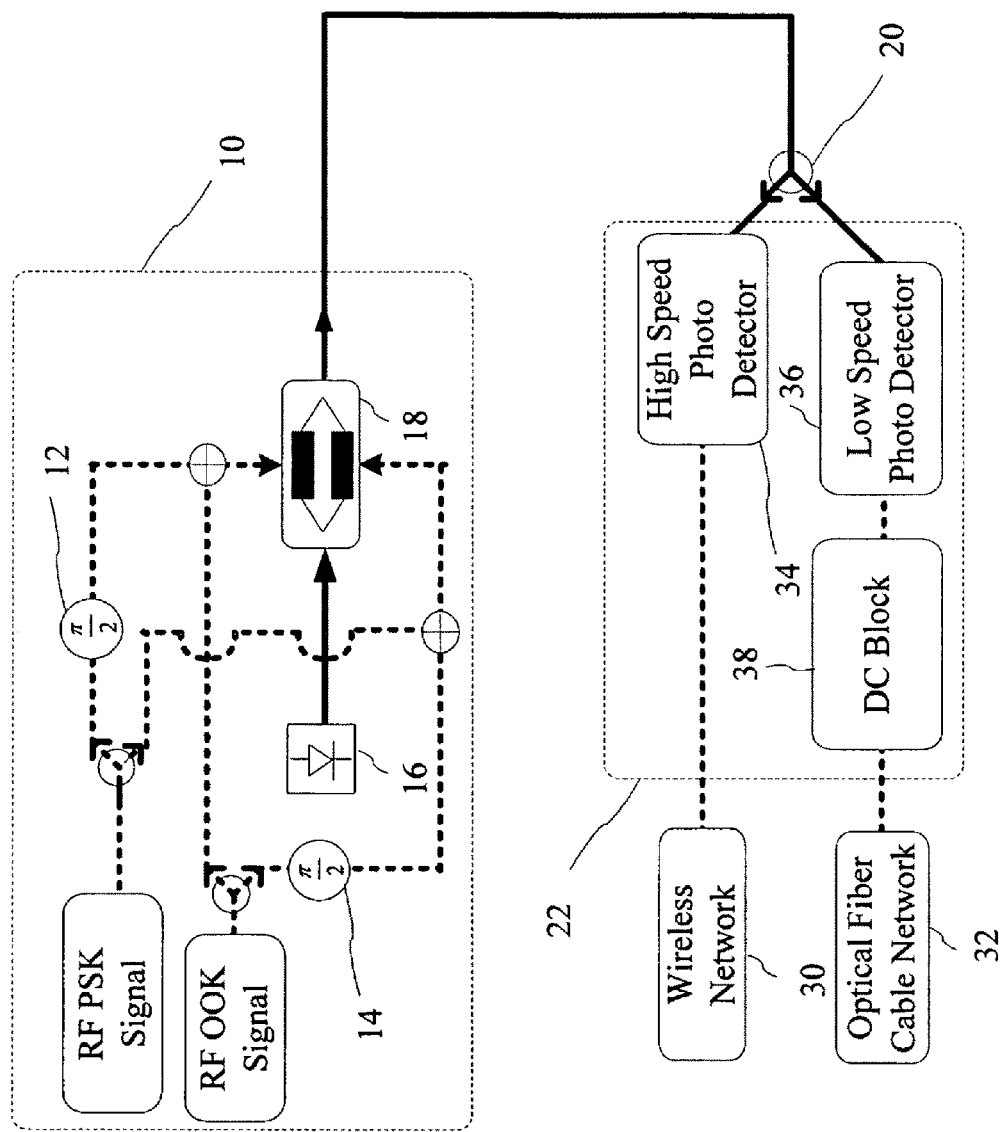
FIG. 2 is diagram schematically showing the architecture of the present invention.

Please refer to FIG. 2 for another diagram schematically showing the architecture of the present invention where the optical receiving device 22 of the present invention is being substitute with alternating device. In this diagram, the optical receiving device 22 comprises a high speed photo detector 34, a low speed photo detector 36 and a DC block 38 wherein the low speed photo detector 36 is combined with DC block 38. The high speed photo detector 34 receives output optical signal splitted from the optical splitter 20 and extracts the RF signal from it, which can be used by wireless network 30 applications. Whereas the low speed photo detector 36 receives output optical signal splitted from the optical splitter 20 and generates an electrical signal, which allows DC block 38 to receive this electrical signal and extract the OOK signal from it, which can be further used by optical fiber cable network 32 applications.

Figure 3:
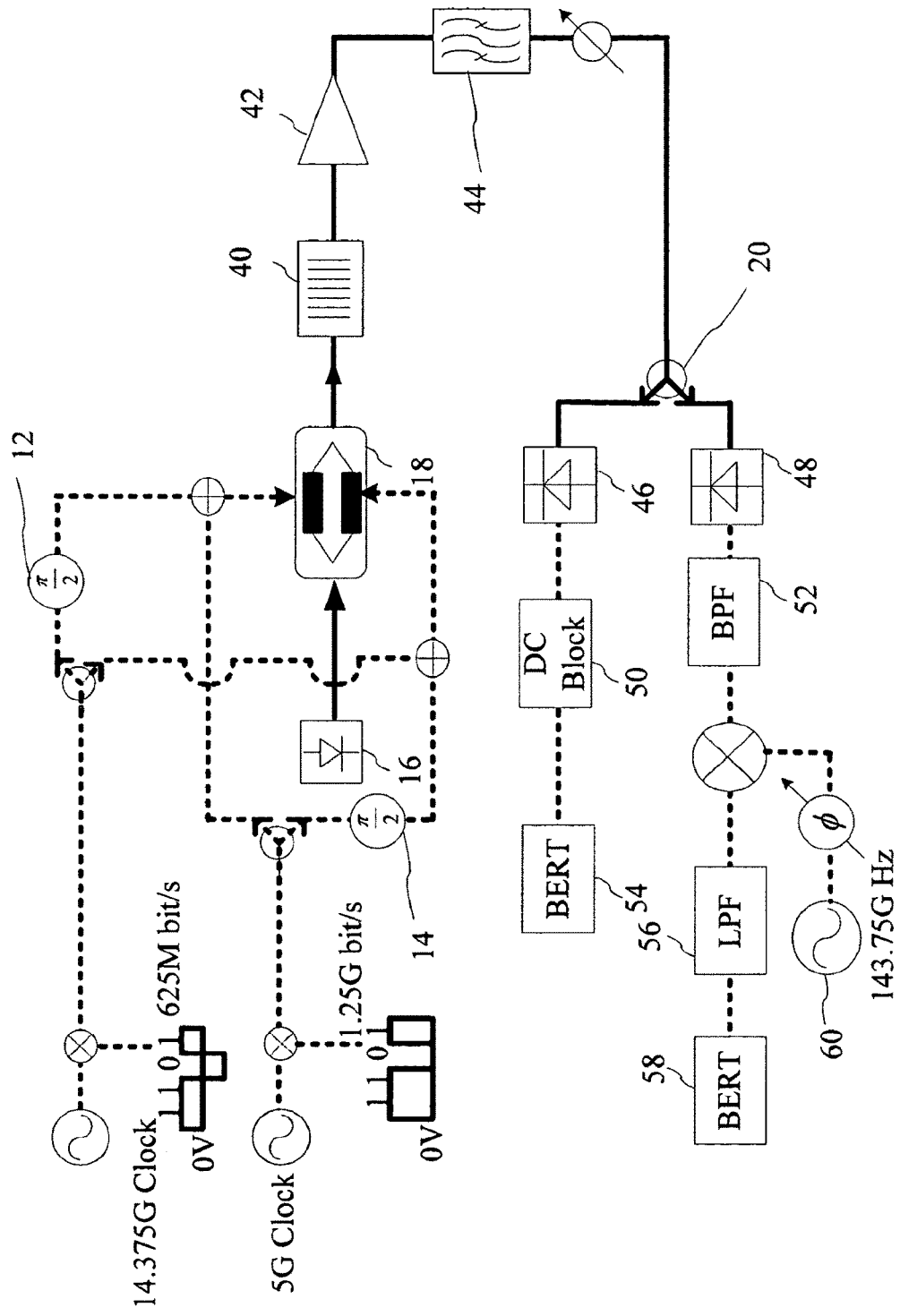
FIG. 3 is a diagram schematically showing the architecture of experimental system of the present invention.

In order to proof the practicability of the present invention, please refer to FIG. 3 for a diagram schematically showing the architecture of experimental system of the present invention. In this setup, it utilizes an OOK signal from 1.25 G (Gb/s) cable network and a PSK signal from 625M (Mb/s) wireless network as illustration. Within the experimental system, the present invention can further install an optical filter 40, an optical amplifier 42 and an optical filter 44 in order between the electro-optic modulator 18 and optical fiber transmission channel. The optical filter 40 will receive the output optical signal from the electro-optic modulator 18 and output the output optical signal after adjusting the output optical signal's optical carrier power. As a result, when photo detect 46 and 48 receives the output optical signal, it will be in optimal condition. The optical amplifier 42 then receives and amplifies the output optical signal received from optical filter 40 and outputs the processed signal, allowing the signal strength of the output optical signal to attenuate slower within the optical fiber transmission channel. Lastly, the optical filter 44 receives the output optical signal from the optical amplifier 42 and filter out noises within the output optical signal, the resulting output optical signal is transmitted to the optical fiber transmission channel.

Figure 4:
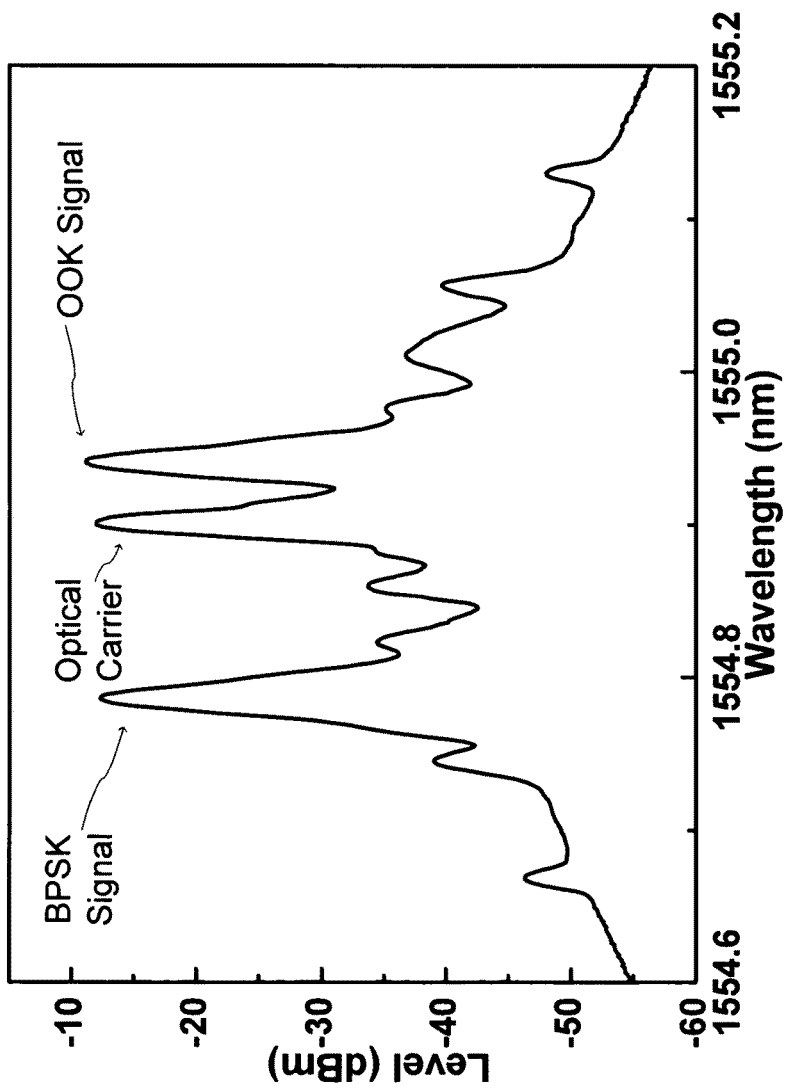
FIG. 4 is a spectra diagram showing the output optical signal of the present invention after passing an optical filter.

Please refer to FIG. 4 for a spectra diagram showing the output optical signal of the present invention after passing an optical filter. The electro-optic modulator 18 generates an output optical signal with one optical carrier, an OOK modulated optical sideband, and one PSK modulated optical sideband, as shown in FIG. 4. After transmission of optical fibers, only one optical coupler 20 is needed to separate the optical power for wireless and wired application. For wireless application, high speed photo receiver and a suitable RF band pass filter is used to receive the RF PSK signals. The high speed photo receiver and the suitable RF band pass filter is a photo detector 48 and a band pass filter 52 respectively in FIG. 3. For Baseband (BB) wired application, the optical carrier and PSK optical sideband signal only contribute DC signals in BB. The DC terms can be easily removed using a DC block. The DC block is a DC block 50 in FIG. 3. Only OOK signals will be observed in BB. Therefore, the present invention does not need a narrow band optical filter to separate the OOK optical sidebands for different applications.

Figure 5:
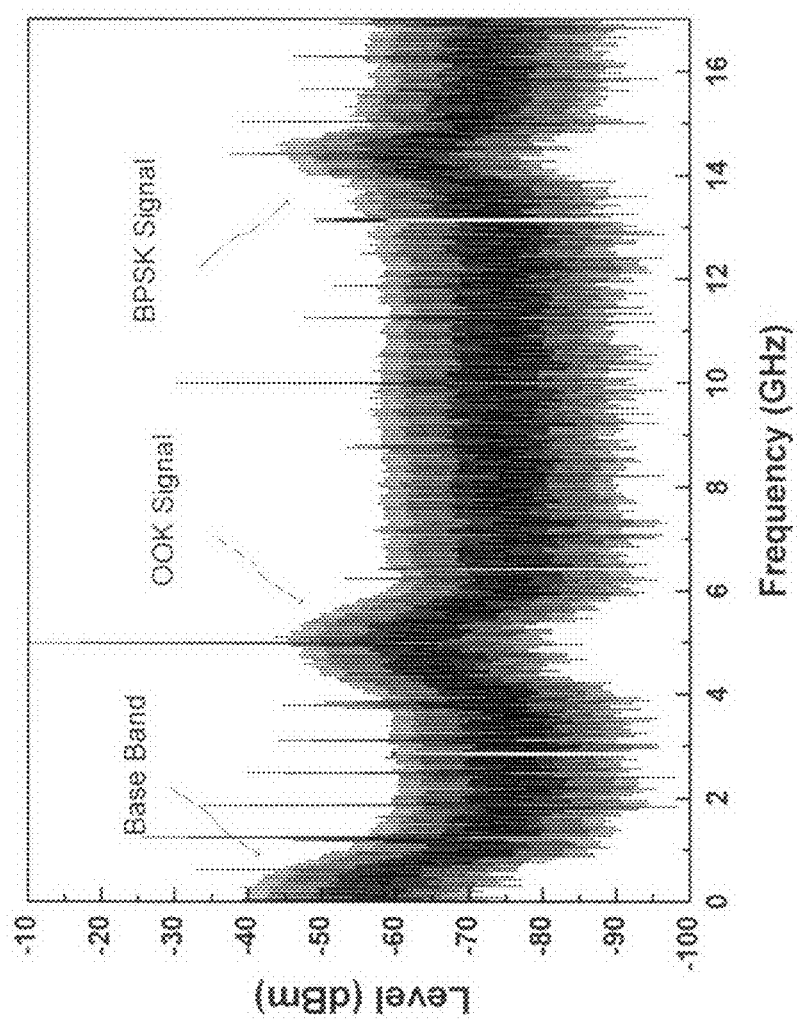
FIG. 5 is an eye diagram showing the output optical signal of present invention after received by an photo detector.

Please refer to FIG. 3 and FIG. 5 at the same time, the modulation method for the PSK signal is phase shift modulation and modulation method for OOK signal is amplitude modulation. In FIG. 5, it can be clearly seen that after applying phase shift modulation to the optical signal, the optical signal would not cause any signal at base band (BB) after the optical signal passed photo detector; therefore, only the signal from amplitude modulation can be observed. As a result, the present invention can discern different signals from different channels by using different frequency band photo detector; that is, the user does not require designing additional optical filters to discern signals from different channels. In addition, the electrical signal mentioned above is not limited to a single wavelength, which allows the present invention to apply on wavelength-division multiplexing systems. Furthermore, the OOK signal of the 1.25 Gb/s cable network can be extracted by low speed photo detector 46 alone, and the PSK signal of the 625 Mb/s wireless network can be extracted by band pass filter 52 (BPF) alone.

Figure 6:
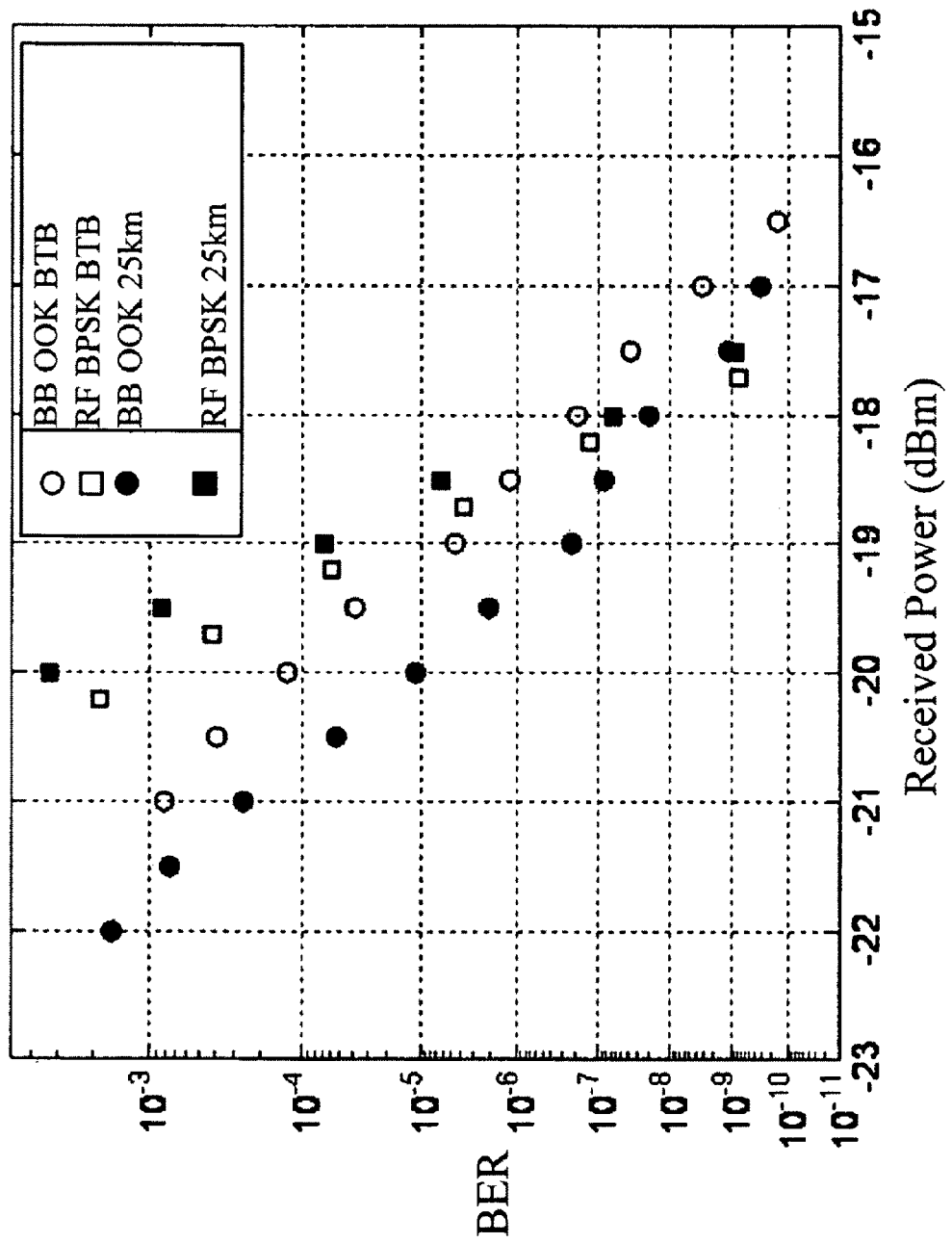
FIG. 6 is a diagram showing BER curves of BB OOK and RF BPSK BTB signal after transmitting over 25 km.

Please refer to FIG. 3 and FIG. 6 at the same time, the experimental system of FIG. 3 uses Bit Error Rate Tester (BERT) 54 and 58 relatively to measure the bit error rate (BER) of the OOK signal of the 1.25 Gb/s cable network and the PSK signal of the 625 Mb/s wireless network after being reduced frequency by a mixer 60. From FIG. 6, it can be seen that after both signal (OOK and PSK) passed the optical fiber transmission channel for over 25 kilometers, the power loss is lower than 0.5 dB, which proofs that the present invention can overcome the obstacle of RF signal strength reduction caused by the optical fiber dispersion over long distance transmission.

The present invention not only eliminates RF signal reduction caused by the optical fiber dispersion, it also allows user to discern RF signal from wireless network and OOK signal from cable network without using any optical filters. The embodiments described above are only to exemplify the present invention but not to limit the scope of the present invention. Therefore, any equivalent modification or variation according to the shapes, structures, characteristics and spirits discloses in the present invention is to be also included within the scope of the present invention.

What is claimed is:

1. An optical access system for dual service network comprising:
    an optical modulation device receiving first and second combinations of signal components, each of said first and second combinations including both a component of an on-off keying signal configured for cable network communication and a component of a radio frequency signal configured for wireless network communication, said first and second combinations having unequal on-off keying signal components and unequal radio frequency components, said optical modulation device modulating said first and second combinations of said on-off keying signal and said radio frequency signal components to an optical signal to generates an output optical signal;
    an optical fiber transmission channel transmitting said output optical signal; and
    an optical receiving device receiving said output optical signal and extracting said on-off keying signal and said radio frequency signal from said output optical signal.

2. The optical access system for dual service network according to claim 1, wherein said optical modulation device further comprises:
    a first phase shifter receiving and shifting phase of said on-off keying signal;
    a second phase shifter receiving and shifting phase of said radio frequency signal;
    an optical signal generator generating said optical signal; and
    an electro-optic modulator receiving an in-phase version of said on-off keying signal and a phase-shifted version of said radio frequency signal from said second phase shifter at one electrical receiving end, and receiving an in-phase version of said radio frequency signal and a phase-shifted version of said on-off keying signal from said first phase shifter at another electrical receiving end, an optical receiving end of said electro-optic modulator receiving said optical signal;
    wherein said electro-optic modulator is biased responsive to a transmission characteristic of said optical signal, said optical signal thereby being modulated with said versions of the signals received by said first electrical receiving end and said second electrical receiving end, said output optical signal being applied to said optical fiber transmission channel.

3. The optical access system for dual service network according to claim 1, wherein said optical receiving device comprises:
    a low speed photo detector receiving said output optical signal from said optical fiber transmission channel and extracting said on-off keying signal from said output optical signal;
    a high speed photo detector receiving said output optical signal from said optical fiber transmission channel and generating an electrical signal responsive thereto; and
    a high pass filter receiving said electrical signal and extracting radio frequency signal from said electrical signal.

4. The optical access system for dual service network according to claim 1, wherein said optical receiving device comprises:
    a low speed photo detector receiving said output optical signal from said optical fiber transmission channel, and generating an electrical signal responsive thereto;
    a DC block receiving said electrical signal and extracting said on-off keying signal from said electrical signal; and
    a high speed photo detector receiving said output optical signal from said optical fiber transmission channel and extracting said radio frequency signal from said output optical signal.

5. The optical access system for dual service network according to claim 3, further comprising an optical splitter receiving said output optical signal from said optical fiber transmission channel and splitting said output optical signal to said high speed photo detector and said low speed photo detector.

6. The optical access system for dual service network according to claim 4, further comprising an optical splitter receiving said output optical signal from said optical fiber transmission channel and splitting said output optical signal to said high speed photo detector and said high pass filter.

7. The optical access system for dual service network according to claim 1, wherein a source of said optical signal is a laser.

8. The optical access system for dual service network according to claim 2, wherein said optical signal generator is a laser diode.

9. The optical access system for dual service network according to claim 2, wherein said first phase shifter shifts the phase of said on-off keying signal by 90 degrees.

10. The optical access system for dual service network according to claim 2, wherein said second phase shifter shift the phase of said radio frequency signal by 90 degrees.

11. The optical access system for dual service network according to claim 2, wherein said electro-optic modulator is being biased to $V\pi/2$ position to effect transmission characteristic of said optical signal.

12. The optical access system for dual service network according to claim 1, wherein said radio frequency signal is in phase shift keying format.

13. The optical access system for dual service network according to claim 12, wherein said phase shift keying format includes binary phase shift keying, quadrature phase shift keying or octal phase shift keying.

14. The optical access system for dual service network according to claim 2, further comprises:

a first optical filter receiving said output optical signal from said electro-optic modulator, then outputting said output optical signal after adjusting said output optical signal in optical carrier power;

an optical amplifier receiving said output optical signal from said first optical filter, then outputting said output optical signal after amplifying signal strength of said output optical signal; and a second optical filter receiving said output optical signal from said optical amplifier and filtering out noises within said output optical signal, then transmitting the receiving filtered output optical signal to said optical fiber transmission channel.

15. The optical access system for dual service network according to claim 1, wherein said on-off keying signal components of said first and second combinations are offset in phase one from the other, and said radio frequency components of said first and second combinations are offset in phase one from the other.

16. The optical access system for dual service network according to claim 2, wherein said electro-optic modulator includes a Mach-Zehnder modulator.

\* \* \* \* \*